United States Patent
Ueno et al.

(10) Patent No.: US 7,123,977 B2
(45) Date of Patent: Oct. 17, 2006

(54) PRODUCTION PLANNING SYSTEM

(75) Inventors: Hidenori Ueno, Yokohama (JP);
Kazumi Ogashiwa, Odawara (JP);
Hiromitsu Asano, Fujisawa (JP);
Toshihiro Tsukishima, Hiratsuka (JP);
Kentaro Taguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/217,283

(22) Filed: Sep. 2, 2005

(65) Prior Publication Data

US 2006/0052894 A1 Mar. 9, 2006

(30) Foreign Application Priority Data

Sep. 3, 2004 (JP) ............... 2004-256419

(51) Int. Cl.
*G06F 19/00* (2006.01)
(52) U.S. Cl. .................. 700/106; 700/100; 705/8; 705/29
(58) Field of Classification Search .......... 700/95, 700/97, 99, 100, 106; 705/8, 28, 29; 707/2
See application file for complete search history.

(56) References Cited

U.S. PATENT DOCUMENTS

| | | | | |
|---|---|---|---|---|
| 4,646,238 A | * | 2/1987 | Carlson et al. | ............... 700/95 |
| 2003/0050870 A1 | * | 3/2003 | Cargille et al. | ............... 705/28 |
| 2003/0233264 A1 | * | 12/2003 | Jones et al. | ............... 705/8 |
| 2004/0117230 A1 | * | 6/2004 | Jones et al. | ............... 705/8 |
| 2005/0015167 A1 | * | 1/2005 | Searcy et al. | ............... 700/100 |
| 2005/0131779 A1 | * | 6/2005 | Kitamura et al. | ............. 705/29 |
| 2005/0177465 A1 | * | 8/2005 | Orzell et al. | ................. 705/28 |
| 2005/0228521 A1 | * | 10/2005 | Nomoto et al. | ............... 700/97 |

FOREIGN PATENT DOCUMENTS

| JP | 2000-079542 | 3/2000 |
|---|---|---|
| JP | 2000-293595 | 10/2003 |

* cited by examiner

*Primary Examiner*—Leo Picard
*Assistant Examiner*—Douglas S. Lee
(74) *Attorney, Agent, or Firm*—Antonelli, Terry, Stout and Kraus, LLP.

(57) ABSTRACT

This invention relates to a production planning system that judges whether or not production can be carried out in accordance not only with a request from a sales side and a demand forecast but also with a production request number or a maximum producible number of sets for each product. In the invention, production request number information of products, parts list information and information about inventory and inventory schedule of each of parts are accepted. When a calculation processing unit calculates a material necessary amount and makes a production plan of the product, it makes the production plan setting a production infeasible number as a new necessary number to a date later than a date designated by the production request information if any production infeasible number of sets exists. Surplus parts information not linked with the production plan is generated and a production addable number is calculated for each product.

9 Claims, 18 Drawing Sheets

FIG. 4

| DATE | PRODUCT | NECESSARY NUMBER | PRIORITY | UTILIZATION SHOP |
|---|---|---|---|---|
| 2004/4/1 | X | 4 | 1 | WAREHOUSE 3 |
| 2004/4/1 | Y | 2 | 2 | WAREHOUSE 3 |
| 2004/4/1 | Z | 6 | 3 | WAREHOUSE 3 |
| 2004/4/2 | X | 4 | 4 | WAREHOUSE 3 |
| 2004/4/2 | Y | 3 | 5 | WAREHOUSE 3 |
| 2004/4/2 | Z | 7 | 6 | WAREHOUSE 3 |
| 2004/4/3 | X | 5 | 7 | WAREHOUSE 3 |
| 2004/4/3 | Y | 4 | 8 | WAREHOUSE 3 |
| 2004/4/3 | Z | 6 | 9 | WAREHOUSE 3 |

| ITEM | INITIAL INVENTORY |
|---|---|
| X | 4 |
| Y | 2 |
| Z | 6 |
| A | 4 |
| B | 3 |
| a | 7 |
| b | 5 |
| c | 3 |
| d | 4 |

| DATE 601 | ITEM 602 | NUMBER OF SETS 603 |
|---|---|---|
| 2004/4/5 | a | 4 |
| 2004/4/5 | b | 2 |
| 2004/4/6 | a | 6 |
| 2004/4/8 | c | 4 |
| 2004/4/10 | d | 3 |
| 2004/4/11 | a | 7 |
| 2004/4/11 | b | 5 |
| 2004/4/14 | a | 4 |
| 2004/4/14 | b | 6 |

FIG. 8

| ITEM (801) | SHOP USED (802) | LEAD TIME (803) |
|---|---|---|
| X | WAREHOUSE 3 | 1 |
| X | ASSEMBLY LINE 3 | 1 |
| Y | WAREHOUSE 4 | 1 |
| Y | ASSEMBLY LINE 4 | 1 |
| A | WAREHOUSE 2 | 1 |
| A | ASSEMBLY LINE 1 | 1 |
| B | WAREHOUSE 2 | 1 |
| B | ASSEMBLY LINE 2 | 1 |
| a | WAREHOUSE 1 | 1 |
| a | PARTS MAKER 1 | 1 |
| ... | ... | ... |

FIG. 9

| ITEM (901) | SHOP USED (902) | SUPPLY SHOP (903) | SUPPLY TIME (904) |
|---|---|---|---|
| X | WAREHOUSE 3 | ASSEMBLY LINE 3 | 1 |
| X | ASSEMBLY LINE 3 | WAREHOUSE 2 | 1 |
| Y | WAREHOUSE 3 | ASSEMBLY LINE 4 | 2 |
| Y | ASSEMBLY LINE 4 | WAREHOUSE 2 | 1 |
| Y | ASSEMBLY LINE 4 | WAREHOUSE 1 | 1 |
| ... | ... | ... | ... |

ADVANCE LINK (SURPLUS PARTS)

POSTPONEMENT LINK (SURPLUS PART)

FIG.11

(1) BEFORE UPDATING OF PRIORITY

| PRIORITY | PRODUCT NAME | NECESSARY DAYS | NUMBER OF SETS | | |
|---|---|---|---|---|---|
| 1 | X | 7/1 | 10 | 10 OK | |
| 2 | Y | 7/1 | 20 | 17 OK | 3NG |
| 3 | Z | 7/1 | 5 | | |
| 4 | X | 7/2 | 10 | | |
| 5 | Y | 7/2 | 10 | | |
| 6 | Z | 7/2 | 10 | | |
| ... | ... | ... | ... | | |
| 98 | X | 7/29 | 2 | | |
| 99 | Y | 7/29 | 4 | | |
| 100 | Z | 7/29 | 2 | | |
| 101 | X | 7/30 | 4 | | |

(1) AFTER UPDATING OF PRIORITY

| PRIORITY | PRODUCT NAME | NECESSARY DAYS | NUMBER OF SETS | |
|---|---|---|---|---|
| 1 | X | 7/1 | 10 | 10 OK |
| 2 | Y | 7/1 | 17 | 17 OK |
| 3 | Z | 7/1 | 5 | |
| ADDITION 4 | Y | 7/2 | 3 | |
| 5(←4) | X | 7/2 | 10 | |
| 6(←5) | Y | 7/2 | 10 | |
| 7(←6) | Z | 7/2 | 10 | |
| ... | ... | ... | ... | |
| 99(←98) | X | 7/29 | 2 | |
| 100(←99) | Y | 7/29 | 4 | |
| 101(←100) | Z | 7/29 | 2 | |
| 102(←101) | X | 7/30 | 4 | |

FIG.12

ADDITION OF SETS

1201 — WEEK: 1ST WEEK (2004.01.19)

1202 — PRODUCT: A

1203 —

| DATE | 1204 NUMBER OF SETS | 1205 ADDABLE NUMBER | 1206 ADDITION NUMBER |
|---|---|---|---|
| 2004.01.19 | 4 | 1 | |
| 2004.01.20 | 4 | 1 | |
| 2004.01.21 | 0 | 2 | |
| 2004.01.22 | 5 | 2 | |
| 2004.01.23 | 0 | 2 | |

SET (1207)   CANCEL (1208)

FIG.14

DELETION OF NUMBER OF SETS

1401 — WEEK — 1ST WEEK (2004.01.19)

1402 — PRODUCT — A

1403 —

| DATE | PRODUCTION EXECUTION NUMBER (1404) | DELETION NUMBER (1405) |
|---|---|---|
| 2004.01.19 | 4 | |
| 2004.01.20 | 4 | |
| 2004.01.21 | 0 | |
| 2004.01.22 | 5 | |
| 2004.01.23 | 0 | |

SET (1406)   CANCEL (1407)

| PRODUCT ||
| --- | --- |
| SHORTAGE: PURCHASE PARTS b (100,50,50,2004,/04/18) ||
| PRODUCTS SHARING SHORT PARTS | DATE |
| PRODUCT X | 2004/04/20 |
| PRODUCT Y | 2004/04/22 |
| PRODUCT Z | 2004/04/18 |

CLOSE

FIG.20

| RETRIEVAL | | FIRST WEEK | | | SECOND WEEK | | | THIRD WEEK | | | FOURTH WEEK | | |
|---|---|---|---|---|---|---|---|---|---|---|---|---|---|
| NO. | PRODUCT | NECESSARY NUMBER (ACCUMULATION) | EXECUTION NUMBER (ACCUMULATION) | MAF (ADDABLE NUMBER) | NECESSARY NUMBER (ACCUMULATION) | EXECUTION NUMBER (ACCUMULATION) | MAF (ADDABLE NUMBER) | NECESSARY NUMBER (ACCUMULATION) | EXECUTION NUMBER (ACCUMULATION) | MAF (ADDABLE NUMBER) | NECESSARY NUMBER (ACCUMULATION) | EXECUTION NUMBER (ACCUMULATION) | MAF (ADDABLE NUMBER) |
| 1 | A | 1 (1) | 0 (0) | 0 (0) | 1 (2) | 0 (0) | 0 (0) | 1 (3) | 0 (0) | 0 (0) | 1 (4) | 0 (0) | 0 (0) |
| 2 | B | 2 (2) | 2 (2) | 0 (0) | 0 (2) | 0 (2) | 0 (0) | 2 (4) | 2 (4) | 0 (0) | 0 (4) | 0 (4) | 0 (0) |
| 3 | C | 4 (4) | 4 (4) | 4 (0) | 1 (5) | 1 (5) | 0 (0) | 2 (7) | 2 (7) | 0 (0) | 0 (7) | 0 (7) | 0 (0) |
| 4 | D | 13 (13) | 13 (13) | 0 (0) | 9 (22) | 0 (13) | 0 (0) | 5 (27) | 9 (22) | 0 (0) | 7 (34) | 7 (29) | 0 (0) |
| 5 | E | 0 (0) | 0 (0) | 27 (27) | 2 (2) | 2 (2) | 29 (27) | 0 (0) | 0 (0) | 27 (27) | 0 (0) | 0 (0) | 27 (27) |
| 6 | F | 11 (11) | 11 (11) | 11 (0) | 8 (19) | 8 (19) | 8 (0) | 6 (25) | 6 (25) | 6 (0) | 4 (29) | 4 (29) | 4 (0) |
| 7 | G | 0 (0) | 0 (0) | 0 (0) | 17 (17) | 17 (17) | 17 (0) | 14 (31) | 14 (31) | 14 (0) | 3 (0) | 3 (0) | 3 (0) |
| 8 | I | 13 (13) | 13 (13) | 0 (0) | 9 (22) | 0 (13) | 0 (0) | 5 (27) | 9 (22) | 0 (0) | 5 (32) | 10 (32) | 0 (0) |

ADDITION  DELETION  SHORT PARTS  OUTPUT  END

PRODUCTION PLANNING SYSTEM

INCORPORATION BY REFERENCE

The present application claims priority from Japanese application JP2004-256419 filed on Sep. 3, 2004, the content of which is hereby incorporated by reference into this application.

BACKGROUND OF THE INVENTION

This invention relates to a technology that makes a production plan of products on the basis of demand forecast and required amounts from a sales side.

To improve profit in the manufacturing industry that gains a profit by manufacturing and selling products, it is necessary to promote the sale of the products and at the same time, to reduce the production cost. The key factor that determines the sales promotion and the reduction of the production cost is agility to demand fluctuation so as to flexibly cope with the demand fluctuation. The agility to the demand fluctuation can be achieved by shortening a planning cycle of the production plan and improving its accuracy.

Generally when a production plan is made, the production side calculates a producible number of products on the basis of the production request number from the sales side. MRP (Material Requirement Planning) is known as one of the calculation methods for calculating the producible number. According to this MRP, the name of the product to be produced ad the production request number of the product are inputted and a link processing for linking the product with parts necessary for producing the product is executed on the basis of a parts list to check producibility. When the parts are short, the production side requests the parts maker to advance the delivery term or to increase the number of ordered parts to satisfy the production requirement.

An example of the production planning system that employs MRP is described in JP-A-2000-79542. The production planning system of JP-A-2000-79542 includes a system for managing the demand of products and a system for managing the production of the product. The system for managing the demand of the product sends the production request number based on the demand of the product to the system for managing the production of the product and the latter executes MRP on the basis of the maximum acquirable number of parts at the present moment. When the parts are found short as a result of MRP, the system for managing the production of the product calculates a producible number of products on the basis of priority of products that is determined in advance and sends the calculation result to the system for managing the demand of the product. The system for managing the demand of the product decides the production execution number on the basis of the difference between the production request number and the producible number and manages the production of the product.

The MRP calculation process in JP-A-2000-79542 described above calculates the producible number by reverse-MRP on the basis of the priority of products set in advance under the condition that short inventory is not permitted when the short inventory occurs with respect to the production request number. The production planning system according to the prior art positions the request from the sales side and the forecast demand as only one solution and makes the production plan even though some of the production request from the sales side cannot be satisfied. Nonetheless, there occurs often the case where the request number can be satisfied if the plan is retarded by one day though the production cannot be made as required on the present day. The prior art technology cannot carry out the production of the production request number in such a case, too, because the request from the sales side and the forecast demand are the only solution, and the loss of sales opportunities occurs eventually.

When the inventory exceeding the production request number exists on the production side, the production side must conduct sales promotion activities to create the demand, to sell the product and to reduce the inventory.

The important aspect for promoting the sale and reducing the cost is the reduction of the loss of sales opportunities and inventory reduction beside the agility to demand fluctuations described above. To reduce the loss of the sales opportunities, it is necessary to correctly calculate the number of sets that can be practically produced on the production side in response to the production request number from the sales side and to reply the calculation result. The sales opportunities may be lost unless the production sides can instantaneously reply the correct producible number on the production side. Though the instantaneous calculation of the of the correct producible number of sets of products is thus very important, it has been difficult to correctly calculate the producible number in response to the production request when the number of kinds of products to be produced is great, the number of parts constituting the products is as large as several hundreds and moreover, the number of common parts among the products is great. In addition, no means has been available that increases and decreases the production number inclusive of products other than the requested product and correctly calculates the producible number of the product.

From the aspect of the increasing and decreasing the inventory, it is important for the production side to always grasp the surplus production capability for each product. For, it is possible to employ the market strategy such that the production side produces on its own judgment the producible product with the parts inventory and asks the sales side to sell the product to create the demand without always producing the product on the basis of the production request number from the sales side and the demand forecast.

SUMMARY OF THE INVENTION

To solve the problems described above, it is an object of the invention to provide a production planning system that not only judges whether or not the production can be made in accordance with the request from the sales side but also calculates how many sets of products can be produced and supplied by which time. It is another object of the invention to provide a production planning system that adjusts the production numbers of sets among a plurality of kinds of products containing common parts and calculates whether or not the production request number or maximum how many sets of products can be produced for each product.

To solve the problems described above, the invention provides a production planning system for making a production plan of products by calculating a material necessary amount for at least one product on the basis of production request information containing a necessary number of the products and a date, parts list information of the products and information about inventory and inventory schedule of each parts, that comprises at least an input unit; an output unit; a storage unit; and a calculation processing unit; wherein the input unit accepts production request information of at least one product, parts list information and information about inventory and inventory schedule of each parts; and when the calculation processing unit generates a production plan of the product by calculating a material necessary amount on the basis of the information inputted from the input unit, the calculation processing unit sets a production infeasible number of sets as a new necessary number to a date later than the date designated by the production request information when the production infeasible number of sets exists for the necessary number of the production request information, calculates the material necessary amount to generate the production plan and outputs the production plan to the output unit. The calculation processing unit further generates surplus parts information not linked with the production plan on the basis of link information with inventory and information about inventory and inventory schedule as a result of the calculation of the material necessary amount, calculates an production addable number of sets for each of the products, and outputs the production addable number to the output unit.

According to the production planning system of the invention, it is possible not only to judge whether or not the production is possible in accordance with the request from the sales side and the demand forecast but also to calculate how many sets are producible by which time.

It is further possible to adjust the production numbers among a plurality of products containing common parts, to calculate the production number greater than the production request number or to calculate maximum how many sets are producible for each product, and thus to reduce the loss of the sales opportunities.

When the production number is great, it has been almost impossible to by manually change the timing to adjust the production. According to the production planning system of the invention, however, it is possible to automatically retard and adjust the production and to determine the feasible production plan even when the production number is great. Therefore, the planner of the production plan can easily adjust the production plan. Even when the production side cannot partially cope with the production request, the production side can adjust the overall production on the basis of the production plane and can shorten the production planning time.

Because the production addable number is displayed for each product, it is possible to know how many sets of which product can be additionally produced or the sale of which product or products must be promoted to reduce the inventory cost. The planning of such a production plan can be interactively executed between the production side and the sales side by using the production planning system of the invention. Because the supply upper limit of the parts maker can be grasped, additional delivery of the parts can be executed without separate negotiation on the telephone or mail. This also provides the effect of shortening the planning time of the production plan. It is further possible to reduce another product in order to add a certain product because the agility to the demand fluctuation can be improved and short parts and the products sharing the short parts can be grasped.

Other objects, features and advantages of the invention will become apparent from the following description of the embodiments of the invention taken in conjunction with the accompanying drawings.

BRIEF DESCRIPTION OF THE DRAWINGS

FIG. 4 explains a structural example of a production request number file;

FIG. 5 explains a structural example of an initial inventory file;

FIG. 6 explains a structural example of an inventory schedule file;

FIG. 8 explains a structural example of a production time file;

FIG. 9 explains a structural example of a supply time file;

FIG. 11 explains a production request number change processing when a link processing of production is not possible;

FIG. 12 shows a display example of a number addition screen;

FIG. 14 shows a display example of a set screen of a deletion production number;

FIG. 20 shows a screen display example of the production planning system.

DECRIPTION OF THE INVENTION

Figure 1:
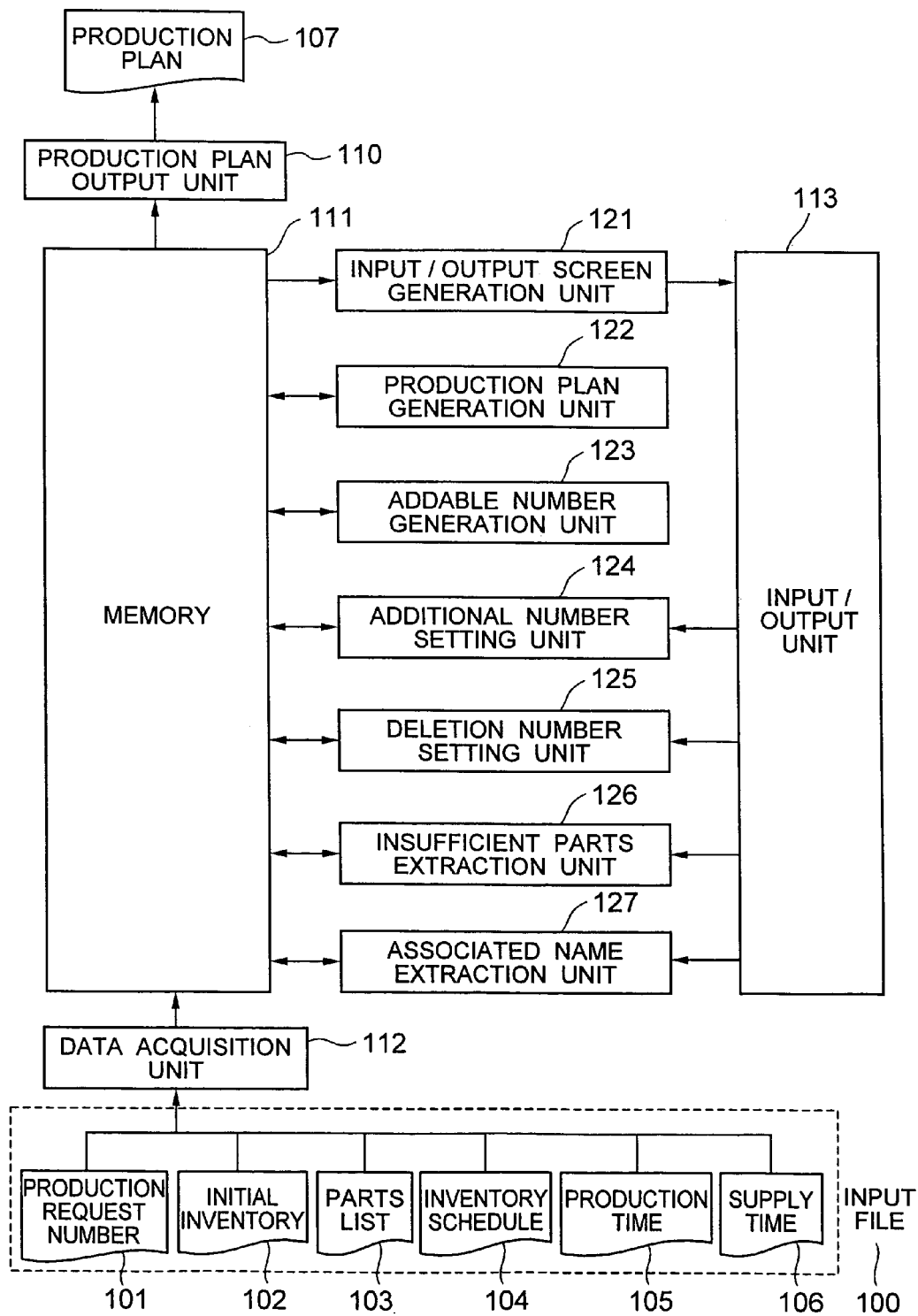
FIG. 1 shows a construction of a production planning system according to an embodiment of the invention.

Preferred embodiments of the invention will be hereinafter explained. To begin with, four functions the production planning system of the invention contemplates to achieve will be explained in connection with the objects of the invention described in "Summary of the Invention".

The first function is to instantaneously judge whether or not the production is possible in accordance with a request from the sales side and if impossible, to generate a production plan.

It is difficult to generate a production plan by manually retarding and adjusting an infeasible production plan when the production number is great. The production planning system according to the invention provides the function of automatically determining a feasible production plan through a computer. As described in "Background of the Invention", the prior art systems calculate the producible number by reverse-MRP on the basis of predetermined priority of products when short inventory occurs with request to the production request number but do not retard the production plan. With such a function alone, the production cannot be carried out for those products which exceed the producible number among the production request number required from the sales side and the loss of sales opportunities occurs. The invention prevents the occurrence of the loss of this sales opportunity.

The second function is to determine the maximum number of product that can be produced for each product.

The prior art systems described above do not have the function of calculating the producible production number exceeding the production request number. For this reason, it is not possible for the production side to know how many sets can be produced at the point of making the production plan. There is the possibility in an actual production line that an inventory exceeding the production request number exists. In such a case, the sale can be increased and the inventory can be reduced by taking sales promotion measures to sell as much as possible the products. Therefore, the production-planning system according to the invention is provided with the function of calculating product-wise the additionally producible product number when parts that are not allocated to the feasible production plan are used. The production side can require the sales sides to promote the sales on the basis of this numerical value.

It is to be hereby noted that there are parts, among parts, that are used in common for a plurality of kinds of products. A method that allocates in advance necessary parts for each product is known but when this method is employed, the value calculated as the addable number becomes smaller than the actual producible number. When each of the products A and B uses one parts C and 100 pieces of the parts C exist as excess, for example, the production planning system according to the invention calculates the addable number of the product A as 100 sets and the addable number of the product B as 100 sets, too, provided that sufficient inventory exists for all the other necessary parts. Quite naturally, this production planning system is the one that can immediately update the addable numbers of the products A and B to 50 sets as soon as 50 sets of products A are added.

The third function is to calculate the addable production number of another product by decreasing the production number of a certain product.

There is the case where the production number must be increased by all means even though the addable number of such a product is 0. In such a case, the forth function is to determine how the production number can be increased by additionally supplying which parts or by decreasing the production number of which product from the production plan.

The embodiments of the production planning system for accomplishing the functions described above will be hereinafter explained with reference to the drawings.

(Definition of Terms)

To begin with, several terms used for the explanation of the embodiments will be defined.

[purchase parts]: parts supplied by suppliers to manufacturer
[semimanufactured products]: those obtained by processing purchase parts or assembling a plurality of purchase parts, or assembling parts and semimanufactured products or semimanufactured products with semimanufactured products.
[parts]: purchase parts or semimanufactured products
[products]: those which are produced from a single or a plurality of parts.
[items]: generic term of products and parts
[shops]: processes and factories for manufacture or warehouses, or vendors supplying the purchase parts.
[reference date]: first day of production plan
[initial inventory]: inventory on the reference day First, the construction of the production planning system of the invention will be explained.

(Construction of Production Planning System)

The construction of the production planning system of the invention will be explained with reference to FIG. 1.

FIG. 1 shows the construction of the production planning system according to an embodiment of the invention.

The production planning system shown in FIG. 1 is accomplished on an ordinary computer including an input/output unit 113, a memory 111, CPU, and so forth. Each processing unit 110, 112 and 121 to 127 of the production planning system to be hereinafter explained has the construction that is accomplished when a program stored in the memory is executed by CPU.

This production planning system generates a production plan and calculates an additionally producible number for each of a plurality of kinds of products. The production plan manages date-wise the production number for each product. Data necessary for calculating the producible number is stored in an input file 100 constituted by a plurality of files. The production planning system acquires the necessary data by reading the input file 100. The input file 100 includes a production request number file 101, an initial inventory file 102, a parts list file 103, an inventory schedule file 104, a production time file 105 and a supply time file 106.

The production request number file 101 stores the production request number set for each product and for each parts on the basis of the request of the sales side and the demand estimation and the priority of production. The initial inventory file 102 stores the inventory number on the reference date for each of the parts, the semimanufactured products and the purchase parts. The parts list file 103 stores the BOM (mill of Materials) of the parts constituting the product and the constitution number for each product. The inventory schedule file 104 stores date-wise the inventory schedule number for each of the product, the semimanufactured products and the purchase parts. The production time file 105 stores the production time of each of the product and the semimanufactured products in each shop. The supply time file 106 stores the moving time between the shops.

Next, the processing content of each construction will be explained.

(Generation of Production Plan, Outline of Production Addable Number Calculation Processing and Flow of Data Among Constructions)

The production planning system of this embodiment has its features in that it establishes not only the production plan for the production request number from the sales side and on the basis of the demand but also calculates the additionally producible number for each product from the products and the parts kept in inventory or scheduled to be supplied, not allocated to the production plan, and provides such an additionally producible number to the user together with the production plan made. Another feature of this system is that it further executes link processing as well as ink release processing upon receiving the additionally producible number and a reduction number inputted by the user who retrieves the production plan and the additionally producible number.

First, a data acquisition unit 112 reads the input file storing various data and stores them into the memory 111. The memory 111 keeps the input file read and as well as link information of the production plan, the addable number for each product in a day unit and the production plan that are calculated by executing calculation and inventory/inventory schedule of products and parts. A production plan making unit 122 makes a production plan that can be executed for the production request number by MRP and parts link information on the basis of the data of the production request number of each product contained in the input file held by the memory, the inventory number and inventory schedule number of each product and parts, the production time and the movement time (supply time) between the shops while taking limitation of the inventory, the production time and the supply time into consideration. An additionally producible number generation unit 123 further calculates the production addable number that can be added for each product from the inventory of those products and parts which are not linked with the production plan made and their inventory schedule (surplus parts data). An additional production number setting unit 124 is a processing portion that accepts the additional number inputted by the user using the production planning system from the input/output unit 113 and executes afresh the link processing of the inventory/inventory schedule of the products and parts on the basis of the data held by the memory. On the other hand, a production number reduction setting unit 125 is a processing portion that accepts a production reduction number of the products inputted by the user using the production planning system from the input/output unit 113 and releases the link of the inventory/inventory schedule of the products and parts linked on the basis of the production request number. A short parts extraction unit 126 is a processing portion that executes an extraction processing of short parts when the producible product number is insufficient with respect to the production request number. An input/output screen generation unit 121 has the function of generating screen information from the data stored in the memory. The input/output unit 113 includes input means such as a keyboard and a mouse and output means such as a display and a printer, and displays the screen information generated by the input/output screen generation portion 121.

Several forms such as a file form and a database form may be conceivable as the form of the input data 100 but the explanation will be given on the assumption that the input data 100 is managed in the file system.

Next, the generation processing of the production plan and the addable number will be explained.

(Generation of Production Plan and Calculation Processing of Addable Number)

First, the outline of the generation processing of the production plan and the addable number as the main processing in the production planning system of the invention and the flow of data among the processing units will be explained with reference to FIG. 2.

Figure 2:
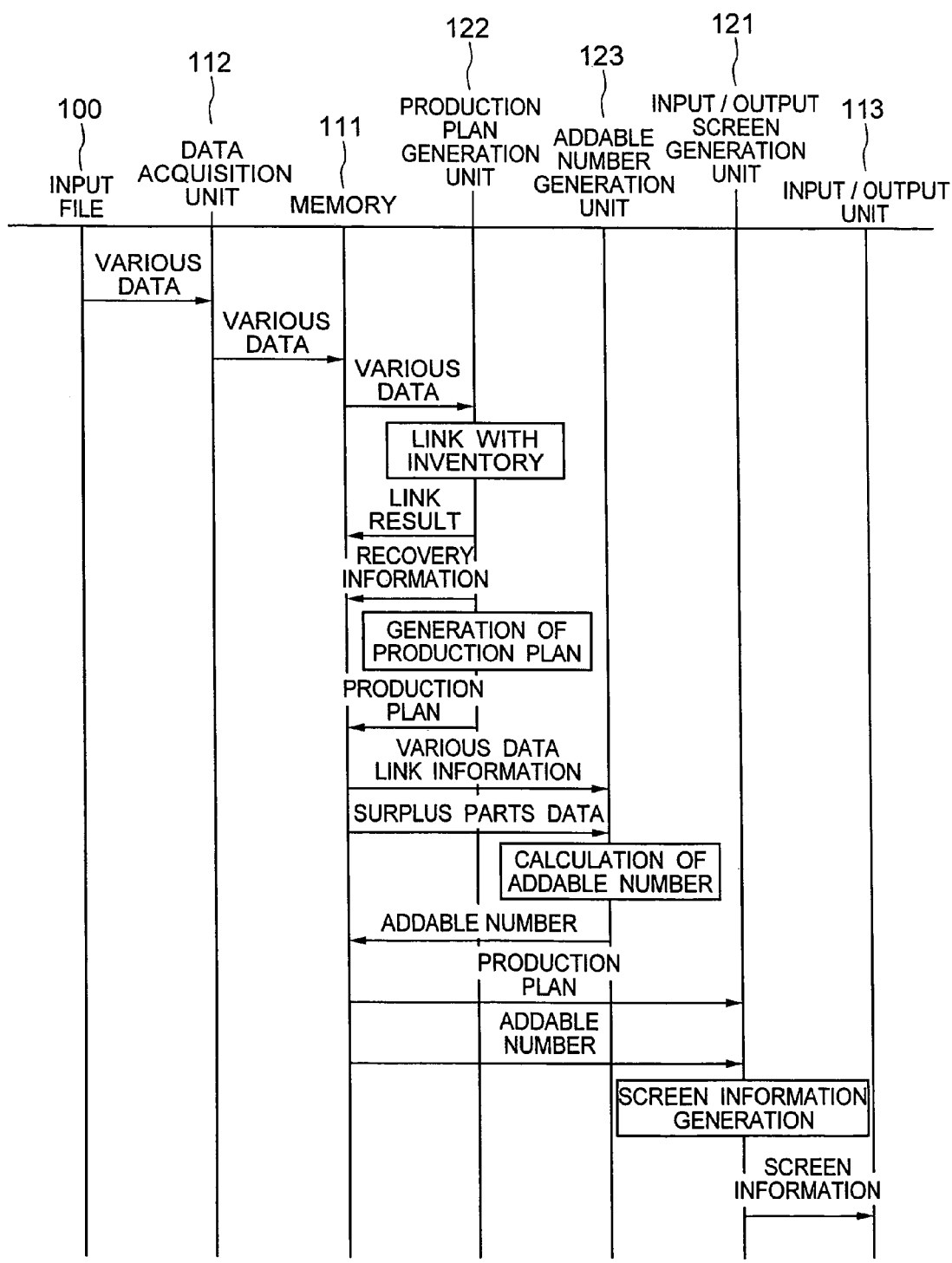
FIG. 2 is a sequence view showing the flow of data among constituent elements of the production planning system according to the embodiment of the invention.

FIG. 2 is a sequence diagram showing the flow of data among the constituent elements at the time of generation of the production plan and the addable production number in the production planning system of the invention.

The data acquisition unit 112 reads the input file 100 and stores various data contained in the input file into the memory 111. The production plan generation unit 122 acquires the data stored in the memory 111 and executes the process of linking the plan and products inventory, parts inventory or ordered parts. When the products and the parts cannot be linked with the plan date, a feasible production plan and recovery information are generated by retarding the production date of the number of products that cannot be produced from the request data to a later date and stores them into the memory 111.

The addable number generation unit 123 acquires various data stored in the memory 111, the link information of the products and the parts for the production plan and surplus parts data, calculates the addable number of products using the surplus parts and stores them into the memory. The input/output screen generation unit 121 acquires the production plan and the addable number from the memory 111 and generates the input/output screen information. The screen information so generated is transferred to and displayed by the input/output unit 113.

The processing of generating the production plan and calculating the addable number will be explained in further detail with reference to FIG. 3.

Figure 3:
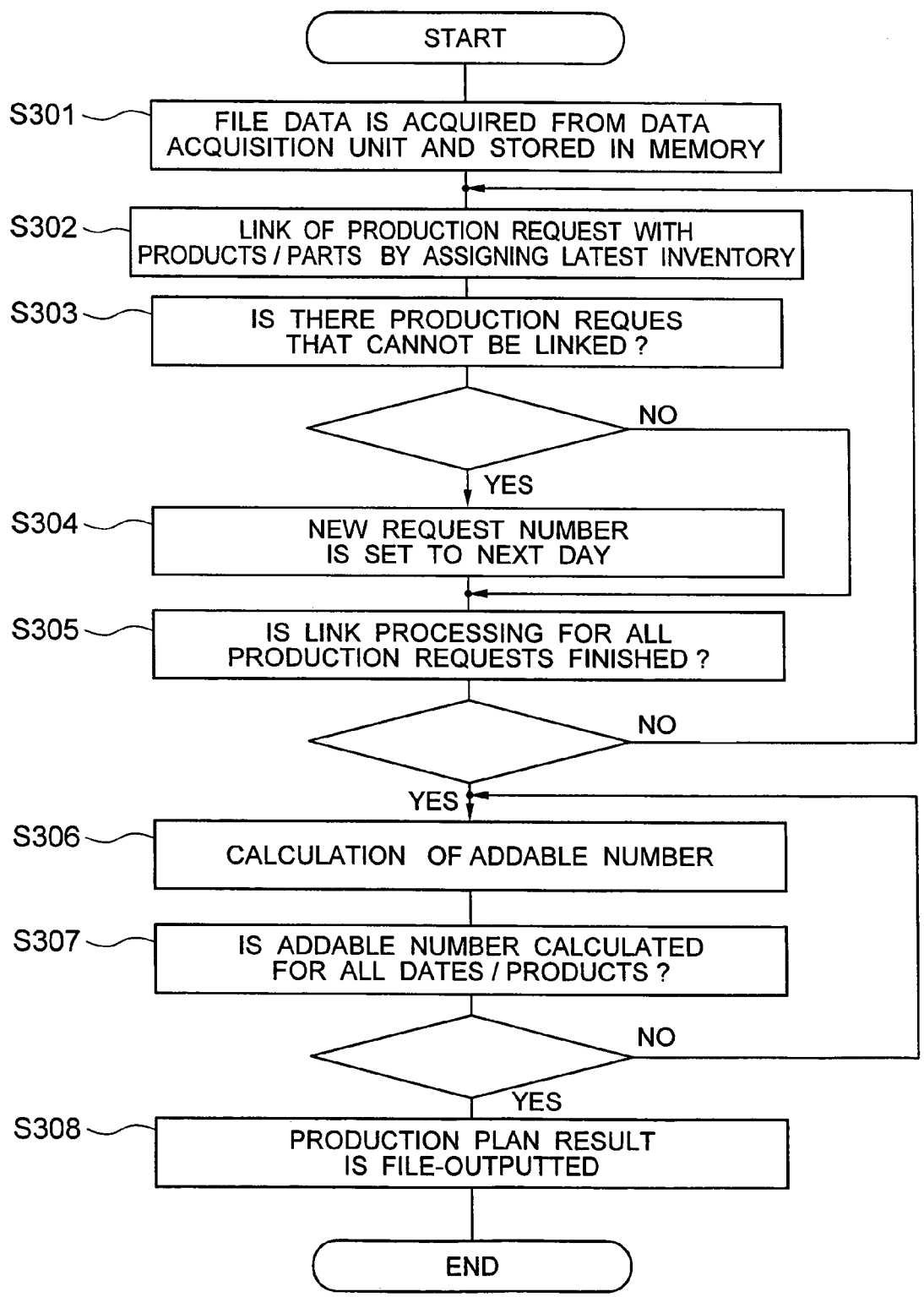
FIG. 3 is a flowchart useful for explaining a generation of a production plan and a calculation processing of an addable number.

FIG. 3 is a flowchart showing the processing of generating the production plan and calculating the addable number. The content of this processing will be explained with reference to a concrete example, though partially overlapping with the content explained in FIG. 2 from time to time.

(Step 301)

In Step 301, the input file 100 is read and various data of a plurality of files contained in the input file are stored in the memory. The input file 100 in this embodiment contains six kinds of files. The construction of these six kinds of files will be explained with reference to FIGS. 4 to 9.

First, a production request number file 101 will be explained. As shown in FIG. 4, the production request number file manages a date 401, a product 402, a required number of products 403 and a shop 405 to be used. Inventory of each product and each parts and the linking sequence of the inventory schedule may be set and managed as link priority (hereinafter called "priority"). A rule may be set in advance so that when the data such as the priority 404 shown in FIG. 4 is not set, the product and the parts at the start of the file have the highest priority and are calculated as having the highest priority. The shop 405 to be used defines the shop (warehouse, etc) from which the products are delivered.

An initial inventory file 102, as shown in FIG. 5, manages an initial inventory 502 on a reference date of respective items (products or parts) 501.

An inventory schedule file 104 has information defining how many of which items are scheduled to be accepted as the inventory, and contains a date 601, an item 602 and an inventory number of sets 603 as shown in FIG. 6.

Figure 7A:
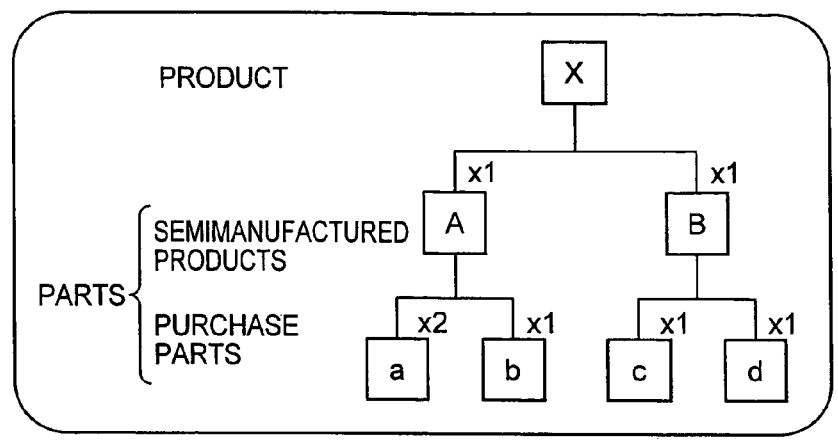
FIG. 7A explains a structural example of a parts list file.
Figure 7B:
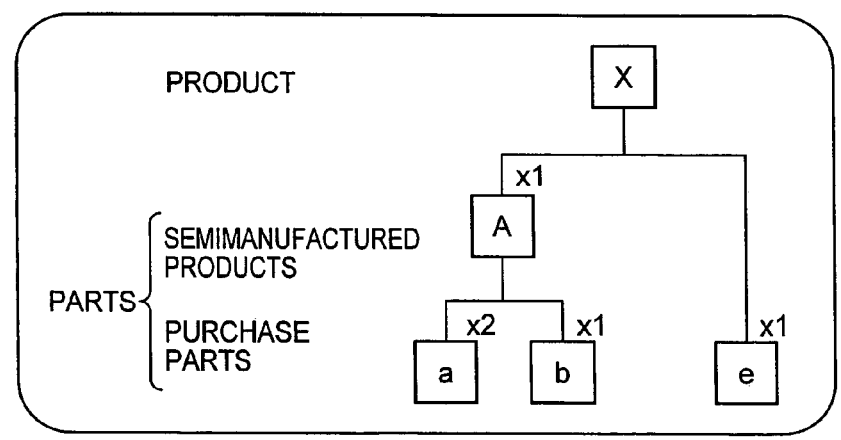
FIG. 7B explains a structural example of the parts list file.
Figure 7C:
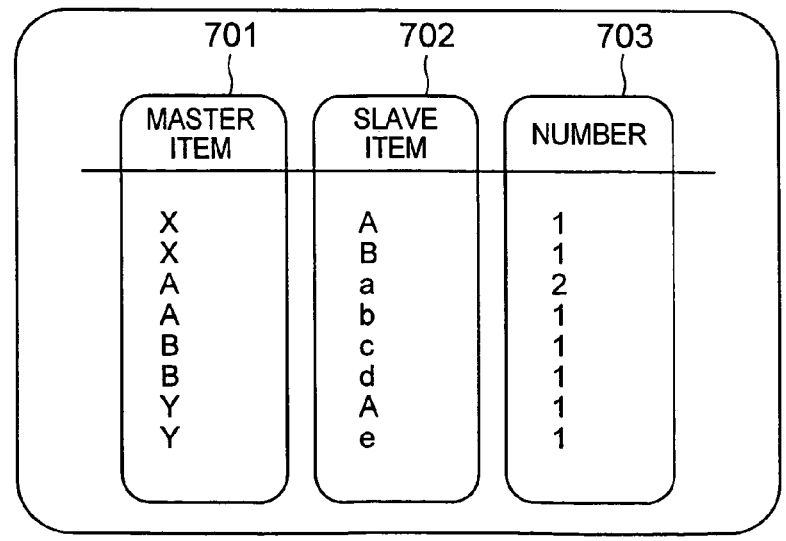
FIG. 7C explains a structural example of the parts list file.

The parts list file 103 is a file expressing BOM (Bill of Materials) that represents the hierarchical structure of the parts and the number of constituent parts shown in FIGS. 7A and 7B. It has the items of a master item 701, a slave item 702 and a number 703 as shown in FIG. 7C. Referring to FIGS. 7A to 7C, a product X is constituted by one each of semimanufactured products A and B. The semimanufactured products A is constituted by one purchase parts a and one purchase parts b and the semimanufactured products B, by one purchase parts c and one purchase parts d.

Figure 21:
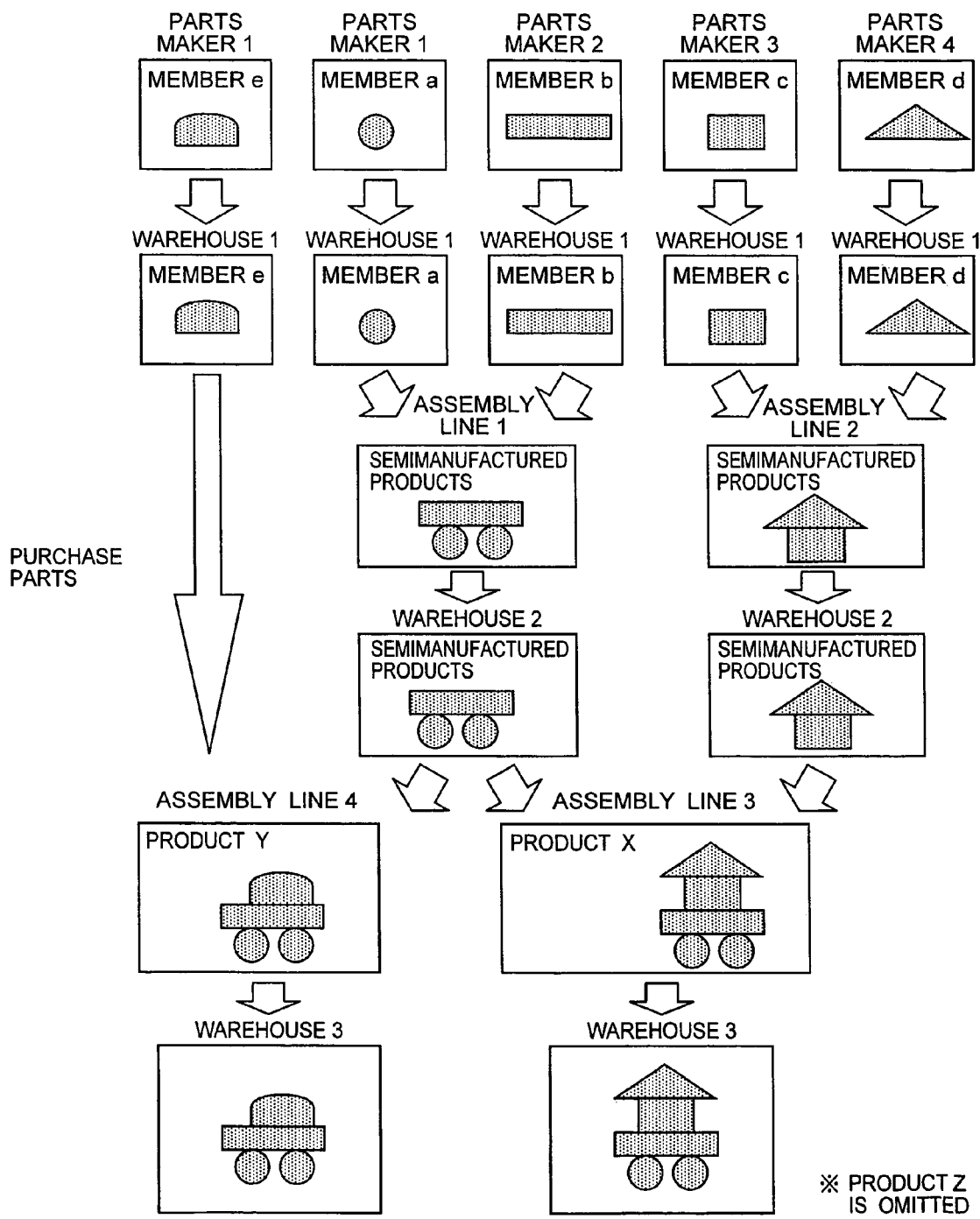
FIG. 21 shows an example of the flow of production from parts purchased to completion of products.

FIG. 21 shows the flow of production from the purchase parts purchased to completion of the product.

FIG. 21 shows also the flow from the purchase of the purchase parts to completion of products X and Y.

The purchase parts a, b, c and d are delivered from parts makers 1, 2, 3 and 4, respectively. The purchase parts delivered are stored in the warehouse 1. The purchase parts a and b are taken out from the warehouse 1 and are assembled at the assembly line 1 to produce the semimanufactured products A. The semimanufactured products A are delivered to the warehouse 2. The purchase parts c and d are taken out from the warehouse 1 and are assembled at the assembly line 2 to produce the semimanufactured products B, which are then delivered to the warehouse 2. The semimanufactured products A and B are taken out from the warehouse 2 and the products X are delivered to the warehouse 3. The parts makers, the warehouses and the assembly lines correspond to the shops, respectively.

The production time file 105 describes the lead time (production time) 803 at the shop 802 employed for the production of the item 801 for each item as shown in FIG. 8. This lead time also manages the acceptance/delivery processing at the warehouses.

The supply time file 106 is a file that manages a supply time 904 for each item as the transfer time from the shop 902 used for producing the item 901 to a supply destination shop 903 to be next used after the production.

(Step 302)

In Step 302, the link processing of linking the items with the inventory/inventory schedule is executed serially by MRP for those products which have higher priority described in the production request number file 101 to cope with the production request on the basis of various data contained in the input file 100. The MRP processing is executed as the parts required day (or required time) and predetermined amounts are retrieved from the movement time among the shops, the lead time required by each product/parts at each shop and the parts list, and the production request number is expanded to the inventory/inventory schedule of the products/parts.

In the example shown in FIG. 4, the link processing is executed for 4 products X of 2004/Apr./1 having the highest priority so that they are taken out from the warehouse 3. The link processing includes an advance link processing and a postponement link processing, and the postponement link processing is hereby executed.

Figure 10A:
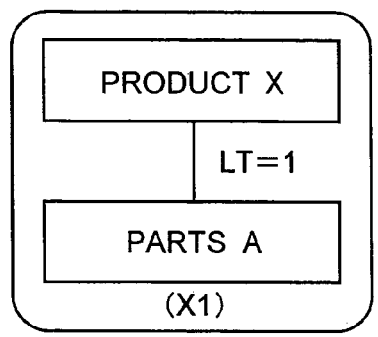
FIG. 10A explains a link processing for allocating an early inventory and a link processing for allocating a later inventory to the production.
Figure 10B:
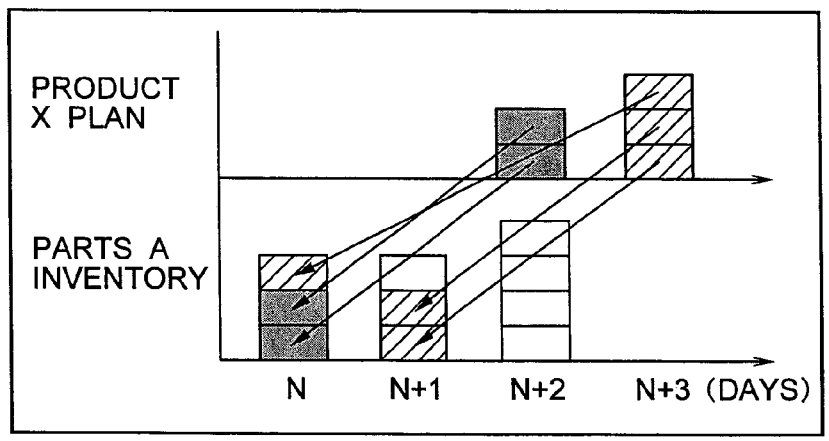
FIG. 10B explains the link processing for allocating an early inventory and a link processing for allocating a later inventory to the production.
Figure 10C:
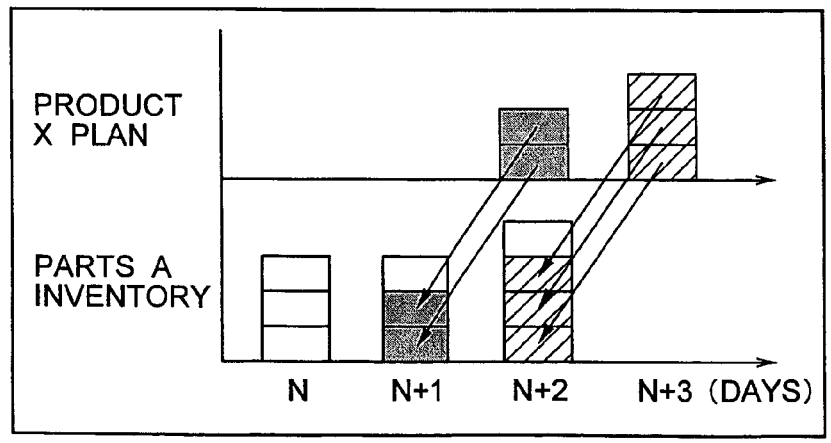
FIG. 10C explains the link processing for allocating an early inventory and a link processing for allocating a later inventory to the production.

FIGS. 10A to 10C show the difference between the advance link processing and the postponement link processing.

FIG. 10A shows an example of a product having a simple BOM construction used for explaining the difference of the link processing methods. The drawing shows that the product X has one component A and its production lead time is 1 day. FIG. 10B explains the advance link processing. The advance link processing serially allocates the inventory stocked earlier than the production plant date of the product X. As shown in FIG. 10B, when the inventory of the parts A is 3 on the production plan date N and 3 on date N+1, 2 parts A are taken out from the inventory of date N for the production of the product X on date N+2, 1 parts A for the production of X on date N+3 is taken out from the inventory of date N and 2 parts A for the production of X are taken out from the inventory of N+1 and so on. On the other hand, the postponement link processing is a method that serially takes out the parts from the inventory of later dates from the production plan date in consideration of the production lead time as shown in FIG. 10C. Surplus parts indicated by white rectangles are taken out for the plan date of an earlier date. More concretely, as for the parts A necessary for the production of X on date N+2, 2 parts A are taken out from date N+1, 3 parts A necessary for the production of date N+3 are taken out from date N+2, and so forth. In the case of the postponement linking, the link process does not occur in the case where the production number is added to the production plan that is once generated. Therefore, the merit of a higher calculation speed can be acquired. In the postpone link processing of this embodiment, the link process is terminate when even a single slave parts that cannot be linked exists. The sequence of the link processing to the parts of the lower order is set on the basis of the data of the input file to (1) inventory of product, (2) inventory schedule of semimanufactured products, (3) inventory of semimanufactured products, (4) inventory schedule of ordered purchase parts, (5) inventory schedule of purchase parts that are not yet delivered and (6) inventory of parts.

The detail of the calculation of the link processing by MRP is omitted because it uses an ordinary MRP. Link information is the one representing which parts are linked with the production plan and manages information representing 5 parts a are used for a certain product (parts) on a certain production plan date, for example.

(Step 303)

MRP is executed. When the product of the production request number is producible, MRP is then executed for the product having next higher priority. When the link processing is not possible and is stopped for certain product and parts for certain products among the production request (when the producible production number is smaller than the production request number), the feasible number and the infeasible number as the balance obtained by subtracting the feasible number from the production request number are stored in the memory and the flow proceeds to the processing of Step 304.

(Step 304)

The production infeasible number determined in Step 303 is used as a new production request number and the new request number is set to the day next to the production plan date for which required amounts of the materials are calculated in Step 303.

This processing will be explained in a little further detail with reference to FIG. 11.

It will be assumed that production plan of 10 sets of the product X on 7/1 exists and the full sets can be produced as a result of calculation of the materials. It will be further assumed that a production request of 20 sets of product Y on 7/1 arises and as a result of calculation of the materials, 17 sets among them can be produced and 3 sets, cannot. In this case, 3 sets that cannot be produced are set as a new production request to the start of the next day. For, the plan of 7/1 is believed to have higher priority than the plan of 7/2.

(Step 305)

When the production request for which the link processing is not yet completed exists, the flow proceeds to Step 302 and MRP calculation is made for the necessary number of products of the next priority.

After the link processing is completed for all the production requests, the flow proceeds to Step 306.

(Step 306)

Calculation of the addable production number is made in Step 306.

In the calculation of the addable production number, virtual production requests are set for each product for those surplus inventories and surplus inventory schedules that are not linked with the production requests as a result of the MRP calculation from Step 302 to Step 305 and up to how many sets can be produced is determined among these virtual production requests when the surplus inventories and the surplus inventory schedules are linked with these production requests.

This addable production number is a number obtained by calculating date-wise how many sets can be produced when the products and the parts that are not linked at that point are used for only that production. To calculate the addable production number, setting of the production request number is made one set by one and whether or not the production is possible is determined for the set necessary number. Alternatively, to shorten the calculation time, setting of a greater request number such as 1,000 sets or 10,000 sets is made and production feasibility is judged. The maximum number that can be set at this time (or in other words, when the products and the parts that can be linked fall within the range of the surplus parts number) is used as the addable production number and calculation is finished at the point at which addition becomes impossible any longer. The addable production number of each product and parts so calculated is stored in the memory.

(Step 307)

Whether or not calculation of the addable production number is made for all the dates and all the products is judged. When all are finished, the processing is finished. The flow proceeds t Step 306 when the processing is not yet finished.

(Step 308)

The production plan output unit outputs the production plan. The production plan contains the addable production number.

The above explains the flow of the generation processing of the production plan and the production process of the addable production number.

When the processing for calculating the necessary material amounts is executed, the difference between the preceding production plan and the new production plan is extracted and when the number of sets of the demand plan is greater than that of the preceding production plan, priority is controlled so that priority can be lowered for the increment. In this way, the result of the preceding production plan is followed and the parts ordered on the basis of the preceding production plan can be effectively utilized. Validity can be set in advance to the necessary number of each product and may be stored in the production request number file. When the plan that cannot be linked is postponed to a feasible date, postponement to the later days can be stopped when this validity is out.

(Screen Display Example of this Production Planning System)

Next, a screen display example of the processing result will be illustrated.

FIG. 20 shows a screen display example of the production planning system of the invention. After the production plan and the addable production number are generated by executing the processing explained with reference to Step 301 to Step 307, the input/output screen generation unit 123 acquires the data of the production plan and the addable production number stored in the memory and generates the display screen. Display of the calculation result in the example shown in FIG. 20 represents the production necessary number for each product (accumulation value of the production necessary number is calculated and displayed inside parenthesis ( ) on the basis of the data so acquired), a production execution number (accumulation value of the definite number is calculated and displayed inside parenthesis ( ) on the basis of the data so acquired) and the addable production number. The data of the calculation result is stored as the daily data but in this screen example, the data acquired from the memory is summed and displayed in each week. It is believed that utilization on the week basis has been used most widely for the practical utilization.

(Change of Production Execution Number of Production Plan)

Next, the addable production number change processing resulting from the change of the production execution number of the production plan will be explained. Setting of the additional number is made in the addable production number setting unit shown in FIG. 1. It is the additional production number setting unit 124 shown in FIG. 1 that executes the change processing of the addable production number.

Figure 16A:
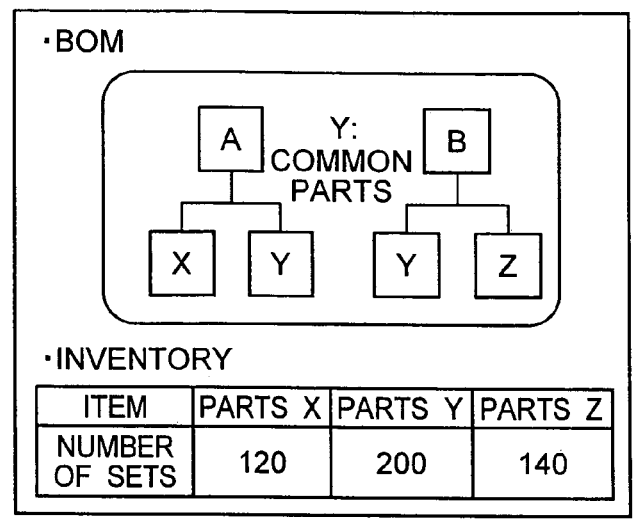
FIG. 16A explains an outline of an addable number calculation processing with the change of a production execution number.
Figure 16B:
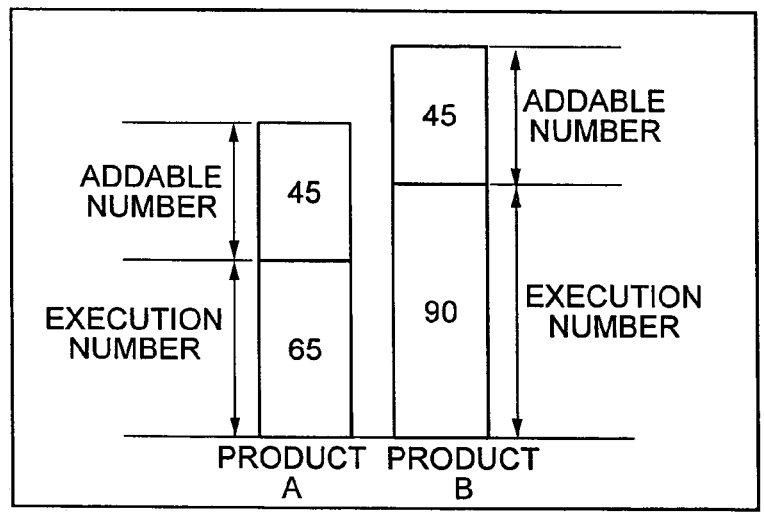
FIG. 16B explains the outline of the addable number calculation processing with the change of a production execution number.
Figure 16C:
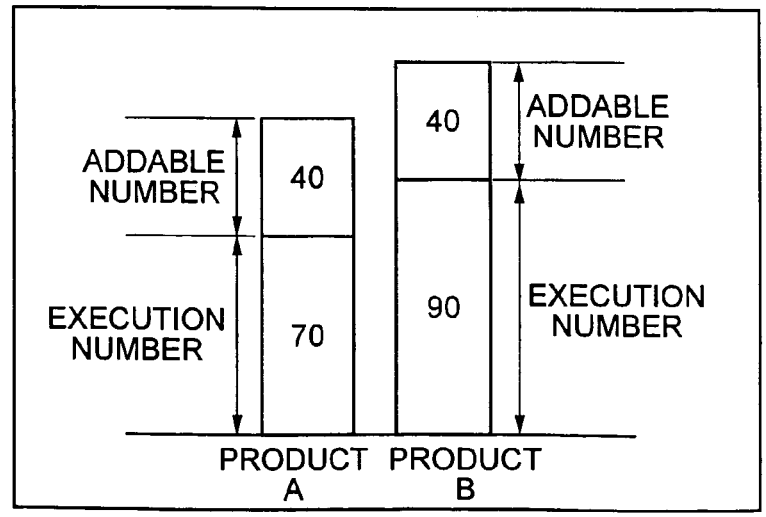
FIG. 16C explains the outline of the addable number calculation processing with the change of a production execution number.

FIGS. 16A to 16C are views for explaining the outline of the addable production number calculation processing resulting from the change of the production execution number. FIG. 16A shows an example of parts construction of the product used for explaining the addable number change processing. The product A uses one each parts X and parts Y. The product B uses one each parts Y and parts Z. This BOM data is the data that can be acquired by looking up the parts list file. First, the parts inventory number that can be utilized is determined. The utilizable parts inventory number is determined from the link information storing the results that can be linked, the initial inventory file and the inventory schedule data. It will be assumed hereby that the parts X is 120, the parts Y is 200 and the parts Z is 140.

FIG. 16B displays by graph image the production execution number of products and the addable production number for explaining the content of the change processing of the addable production number resulting from the change of the production execution number of the production plan. The data of the production execution number of the products and the addable production number is stored in the memory. When the production execution number of the products A is 65 sets, it can be found by calculation from the link information that the products A use 65 parts X and 65 parts Y, respectively. When the production execution number of the products B is 90 sets, it can be found by calculation from the link information that the products B use 90 parts X and 90 parts Y, respectively. Next, the surplus parts number is calculated. Here, 65 parts X, 155 parts Y and 90 parts Z are used. The surplus numbers of the parts X, Y and Z are calculated as 55, 45 and 50, respectively, from the numbers of parts that have already been linked for the products A and B, and from the utilizable parts inventory numbers calculated previously. A method of calculating the addable production number of each of the products A and B by using these surplus parts will be explained. In this embodiment, the addable production number is calculated on the premise that all the surplus parts can be used for only one kind of product. First, the addable production number of sets of the product A is calculated. The calculation result of the utilizable parts inventory number is 55 for the parts X and 45 for the parts Y. The product A is constituted by one each parts X and parts Y from the parts list data. The number of parts Y, i.e. 45, renders the limit on the basis of the constituent parts number determined from BOM and the utilizable parts number and the addable production number of the product A is calculated as 45. In the case of the product B, 45 parts Y and 50 parts Z can be used and the number of parts Y, that is, 45, renders the limit by a similar processing. Therefore, 45 sets can be determined as the addable production number.

Next, the change processing of the production execution number of the products will be explained. It will be assumed hereby that the user of the production planning system adds 5 sets of the production sets of the products A as the change value of the production execution number from the input unit and inputs a numerical value of 70 sets. FIG. 16C shows the image when the production execution number is changed from the state shown in FIG. 16B. Receiving the input of the change value of the production number, the production planning system side first looks up the parts list file, the link information, etc, calculates again the surplus parts numbers of the parts X, Y and Z because five sets of the products A use five pieces of each of the parts X, Y and Z, stores 50 pieces, 40 pieces and 50 pieces as the calculation result in the memory and displays them on the screen (the parts Z remain unchanged). The addable production number is again calculated and as a result, the addable production number is found as 40 sets for the products A and 40 sets for the products B, too. These new addable production numbers are stored in the memory and are afresh displayed on the screen.

Next, the setting method of the additional number will be explained.

FIG. 12 shows a display example of the set number addition screen.

Addition of the production number can be set within the range of the addable production number. Week 1201 and product 1202 represent the week and the product that are selected on the main screen. Date 1203 displays the date corresponding to the week 1201. Number of sets 1204 and addable production number 1205 display a plan production execution number and an addable production number per date, respectively. Addition number 1206 is a window to which the user inputs the addition number and setting is made in a day unit.

Figure 13:
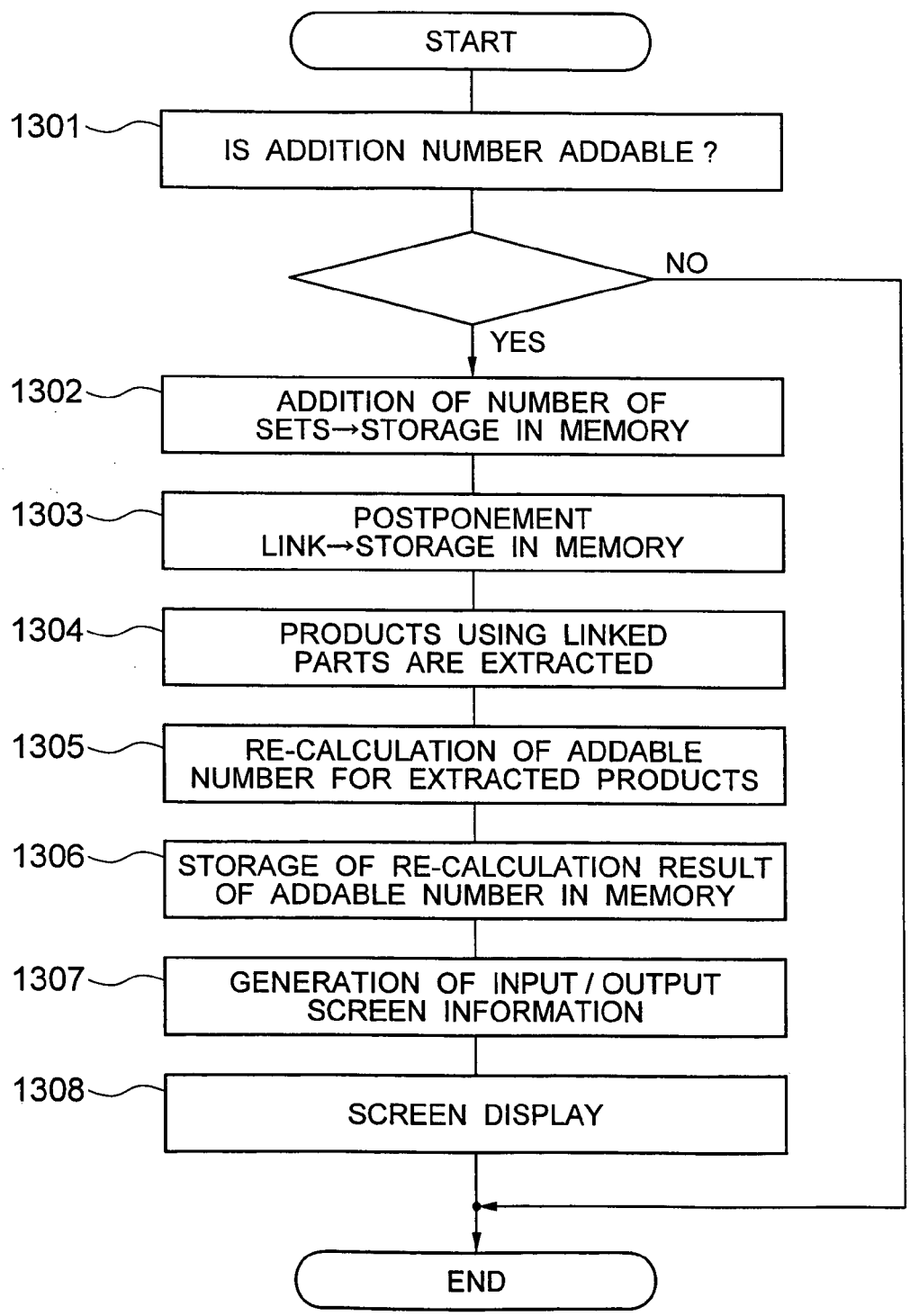
FIG. 13 shows an addition processing flow of the production addition number.

FIG. 13 shows the processing flow when the number of sets is added.

(S1301)

First, the addition number inputted by the user of the system is accepted. This value is compared with the addable production number determined as described above to judge whether or not it is smaller than the addable production number. The processing is finished when the user sets the number that exceeds the addable production number.

(S1302)

The addition number is stored in the memory.

(S1303)

The postponement link processing is made for the addition number of sets and the link information of the addition number of sets with the products and the parts is stored in the memory.

(S1304)

The parts list data is traced back and the products using the parts allocated afresh in Step 1303 are extracted.

(S1305)

The addable production number is again calculated for the products extracted.

(S1306)

The re-calculation result of the addable production number is stored in the memory.

(S1307)

The information displayed in the addable number window of the input/output screen is updated.

(S1308)

The screen is displayed.

Next, the setting processing of the deletion production number will be explained.

This processing is the one that is executed by the deletion production number setting unit 125 shown in FIG. 1.

FIG. 14 shows an example of a set screen of the deletion production number.

Week 1401 and product 1402 represent the week and the product that are selected on the main screen. Date 1403 displays the date corresponding to the week 1401. Production execution number 1404 represents a plan production execution number for each date. Deletion production number 1405 is a window to which the user inputs the number after deletion and setting is made in a day unit. It is also possible not only to release, with deletion, the link of the products and the parts that have so far been linked but also to re-calculate the addable production number.

Figure 15:
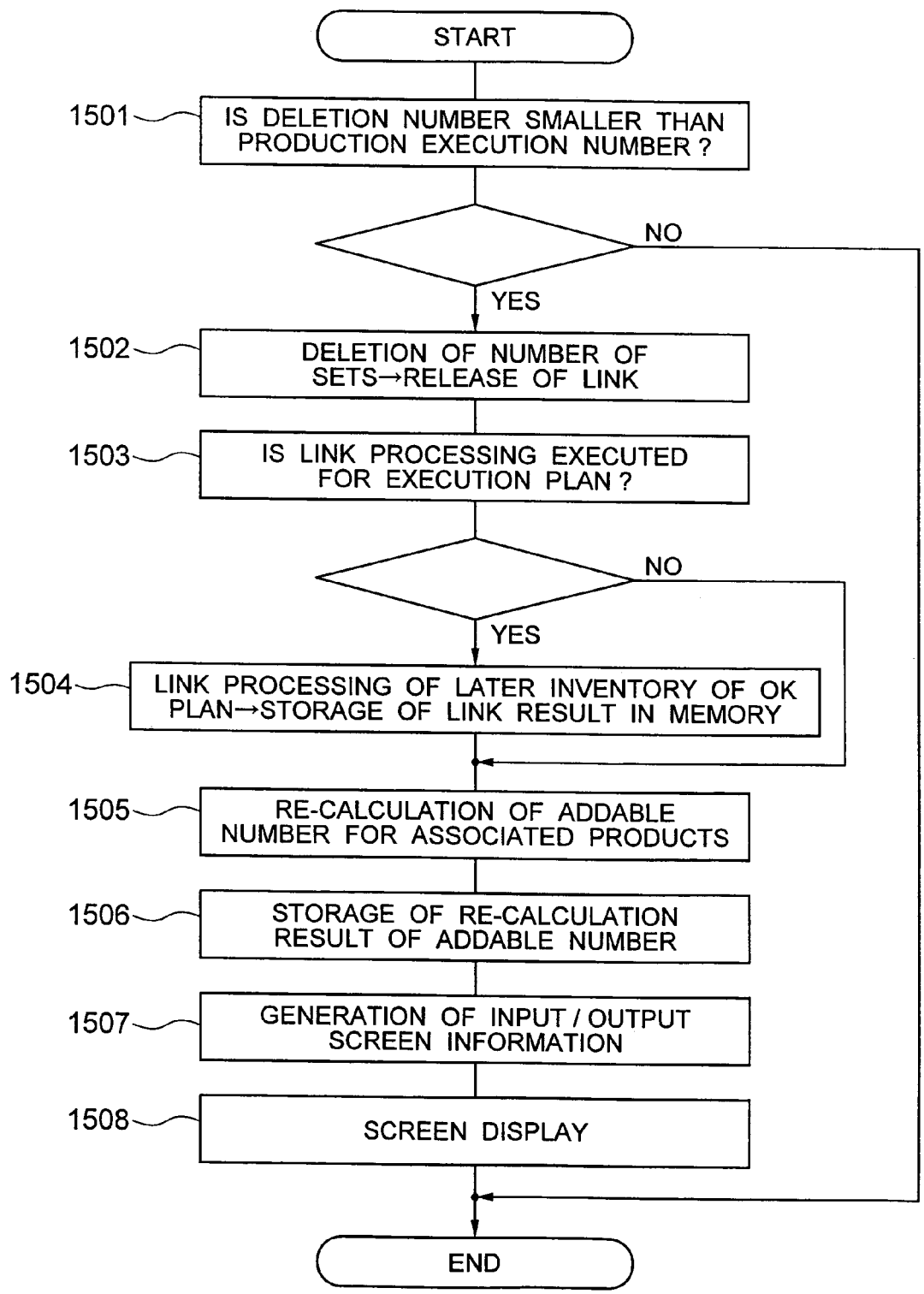
FIG. 15 shows a deletion processing flow of the production number.

FIG. 15 shows the processing flow when the production number is deleted.

(S1501)

First, whether or not the deletion production number inputted by the user of the system is smaller than the production execution number is judged. The processing is finished when the production execution number is greater.

(S1502)

The link information and the inventory information are looked up for the deletion production number and the link of the products and the parts that have so far been linked are released. The link information and the inventory information are updated.

(S1503)

When the change of the link is made for deletion, the flow proceeds to Step S1504. When this operation is not made, the flow proceeds to S1505.

The reason why the change of the link is made is because the surplus parts can be determined beforehand (time-wise) by deleting the production execution number of sets and changing the link to the postponement link.

(S1504)

The change of the link is executed.

(S1505)

The addable production number is re-calculated for those products and parts the link of which is released in Step S1502.

(S1506)

The result of S1505 is stored in the memory.

(S1507)

The information to be displayed in the addable production number window on the input/output screen is updated.

(S1508)

The screen is displayed.

Next, the calculation processing of short parts will be explained.

Figure 17A:
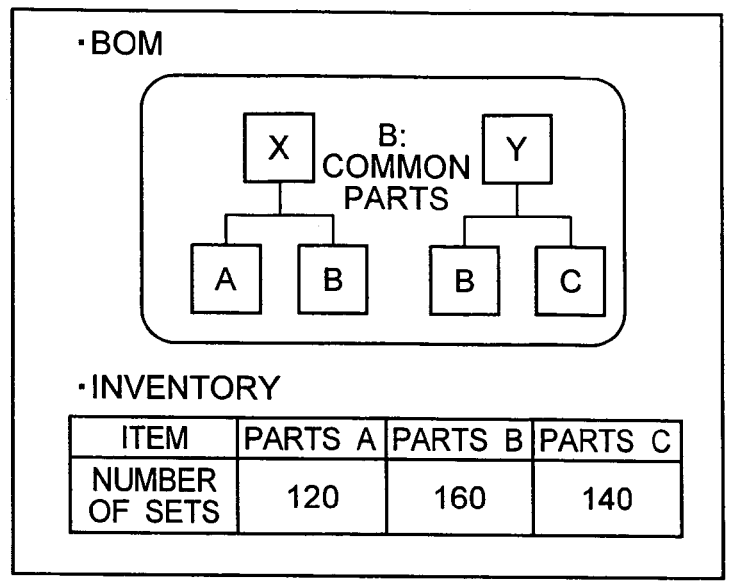
FIG. 17A explains an outline of a calculation processing of short parts.
Figure 17B:
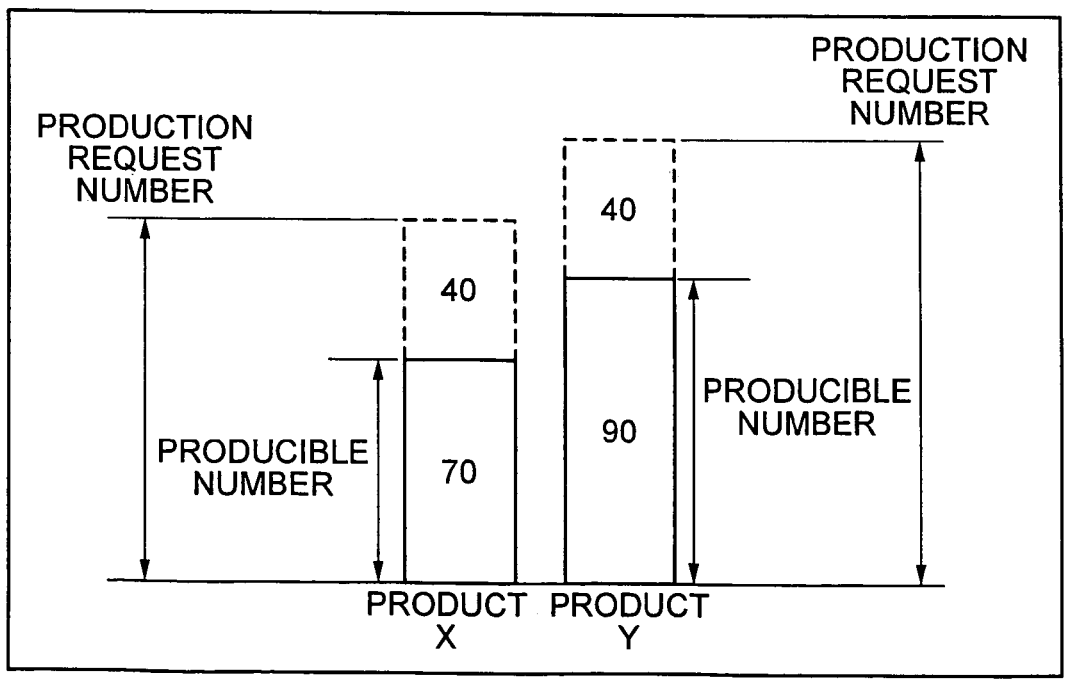
FIG. 17B explains the outline of the calculation processing of short parts.

FIG. 17A to 17C explain the outline of the calculation processing of the short parts.

FIG. 17A shows a parts construction example of a product used for explaining the calculation processing of the short parts. The product X uses one each parts A and parts B. The product Y uses one each parts B and parts C. In this example, the parts B is a common parts for the product X and the product Y. This parts construction data is the one that can be acquired by looking up the parts list file.

In the calculation processing of the short parts, the utilizable parts number of the parts inventory is first calculated. The utilizable number of the inventory parts is calculated from the initial inventory file, the inventory schedule data and the link information storing the link result. It will be assumed hereby that 120 pieces of A, 160 pieces of B and 140 pieces of C are available. Next, the production request number is read and the necessary parts are linked. When the production request numbers described in the production request number file of the input file are 110 sets for X and 140 sets for Y, then, the parts B become the limit as a result of the link process. Next, the production execution numbers of the products X and Y are calculated in accordance with the method of determining the production execution number that is determined in advance. It will be further assumed that the production execution numbers of the products X and Y are 70 sets for the product X and 90 sets for the product Y as a result of calculation. Next, the surplus parts after linking of these production execution numbers are calculated. The surplus parts are 50 pieces for the parts A, 0 piece for the parts B and 50 pieces for the parts C as a result of the calculation processing of the surplus parts described above. Subsequently, the insufficient numbers of the products are calculated. The short number of the product X is (production request number 110)–(production execution number 70)=40 sets. The necessary number of each parts necessary for producing the short product is calculated by looking up the parts construction data. To produce the products X, 40 pieces of each of the parts A and B are found necessary from the short number of the products and the component construction data. The short number of each parts is calculated by comparing the necessary number of the parts and the calculation result of the surplus parts. More concretely, the calculation result of the surplus parts is 50 pieces for the parts A and is greater than the necessary number, i.e. 40 pieces, of the parts A. The parts A are not short. On the other hand, the surplus is 0 for the parts B whereas the necessary number is 40 pieces and the short parts number is 40 pieces. In other words, the calculation reveals that the short parts are the parts B and the short number is 40 for the product X. Similarly, the short number of the products is 50 sets for the product Y because the production request number is 140 and the production execution number is 90 sets. The short numbers of the parts Y and Z are 50 pieces for the parts Y and 0 for the parts Z from the necessary number of each parts for producing 50 sets of the product Y and from the surplus parts number in the same way as in the product X.

Figures 18, 19:
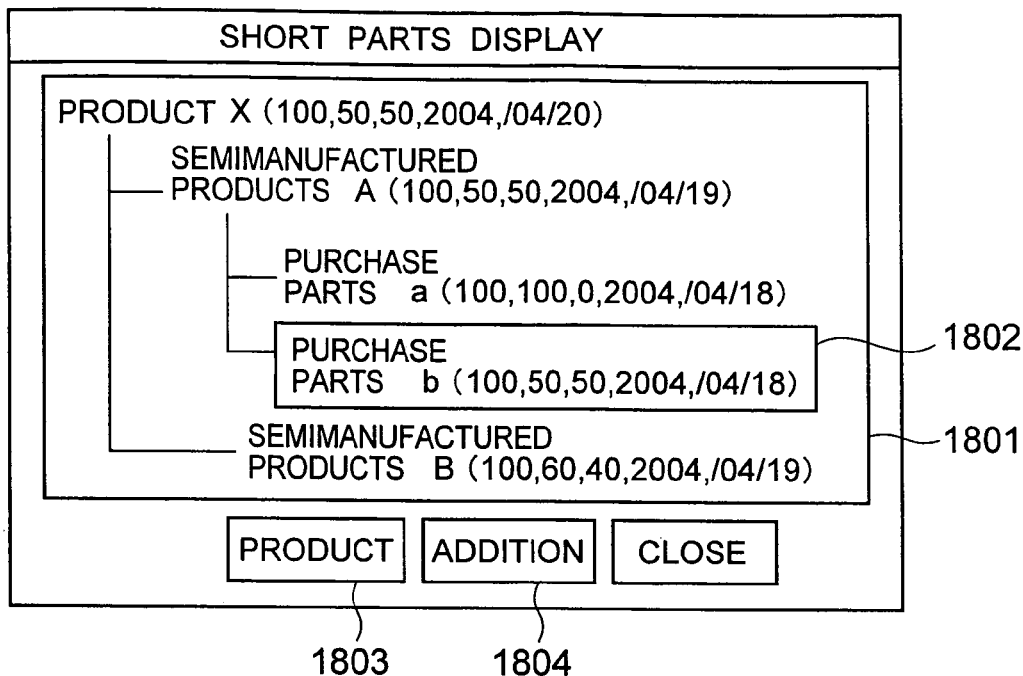
FIG. 18 shows an example of a screen display of the calculation processing result of the shot parts.
FIG. 19 shows a display example of products using in common the short parts.

FIG. 18 shows an example of the screen display of the calculation processing result of the short parts.

Tree 1801 represents the parts construction of the product X on the basis of the parts list data.

The content of the parenthesis ( ) represents (production request number, producible number, short number, required date). The production request number and the producible number may be the accumulation numbers from the production reference date or the production request number and the producible number on the selected day. For example, purchase parts b1802 represents that the producible number is 50 sets for the production request number of 100 sets, the short number is 50 sets and the required date (day on which the parts are required) is 2004/Apr./18. Preferably, the short parts are displayed by different colors for warning. When the purchase parts b is selected and the production button 1803 is clicked, the products using the purchase parts b in common are displayed on the list. As described in Step 1304 for the set processing of the addition number, the products using the purchase parts b are extracted by tracing up the parts list data. This processing is executed by the associated name extraction unit 127 shown in FIG. 1.

FIG. 19 shows an example of the screen display of the products using in common the short parts.

When the purchase parts b is selected and the addition button 1804 is clicked on the screen shown in FIG. 18, the inventory number of the purchase parts b is additionally displayed on the screen. The system accepts the addition number inputted by the user on the addition screen of the inventory number of the purchase parts, adds the number to the inventory schedule file of the purchase parts b and requests other systems operating in the interlocking arrangement to place the additional order.

When the production request is not satisfied as described above, it is possible to send the additional delivery or the delivery date advance request of the parts to the parts makers without setting the new request number on the day next to the plan date and executing the link processing and to acquire the addable supply number from an addable supply number management system such as the production planning system of the embodiment.

When the parts maker has a system like the production planning system of the embodiment, the production planning system of the embodiment acquires supply upper limit information of the parts maker through the network to the inventory schedule file of the input file 100 and manages the information as the inventory schedule number of the parts.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A production planning system for making a production plan of products by calculating a material necessary amount for at least one product on the basis of production request information containing a necessary number of the products and a date, parts list information of the products and information about inventory and inventory schedule of each parts, comprising at least an input unit; an output unit; a storage unit; and a calculation processing unit;
   wherein the input unit accepts production request information of at least one product, parts list information and information about inventory and inventory schedule of each parts; and
   when the calculation processing unit generates a production plan of the product by calculating the material necessary amount on the basis of the information inputted from the input unit, the calculation processing unit sets a production infeasible number of sets as a new necessary number to a date later than the date designated by the production request information when the production infeasible number of sets exists for the necessary number of the production request information, calculates the material necessary amount, generates the production plan and outputs the production plan to the output unit.

2. A production planning system according to claim 1, wherein the calculation processing unit executes:
   generation of surplus parts information not linked with the production plan on the basis of link information with inventory and information about inventory and inventory schedule as a result of the calculation of the material necessary amount; and calculation of an addable production number of sets for each of the products, and outputs the addable production number to the output unit.

3. A production planning system according to claim 2, wherein said calculation processing unit, when an additional production request number of the product is inputted from the input unit, executes:
   judgement as to whether or not the additional production request number so inputted is smaller than the addable production number;
   when the additional production request number is smaller than the addable production number, a link processing of the inventory by calculating the material necessary amount on the basis of the additional production request number, the parts list information and the information about inventory and inventory schedule to generate a new production plan, and control an output of the new production plan to the output unit;
   generation of surplus parts information not linked with the production plan, from the link result based on the additional product request number, the information about inventory and inventory schedule and the parts list information;
   re-calculation of the addable production number for each product on the basis of the surplus parts information; and
   control to output the addable production number to the output unit.

4. A production planning system according to claim 2, wherein said calculation production unit, when a deletion number of the production number of the product is inputted from the input unit, executes:
   judgement as to whether the deletion number of the production number so inputted is smaller than the production plan number;
   when the deletion number is smaller than the production plan number, release of the link of the inventory on the basis of the deletion number inputted, the parts list information and the information about inventory and inventory schedule, to generate a new production plan, and control an output of the new production plan to the output unit;
   generation of surplus parts information not linked with the production plan, from the link release result based on deletion of the production number, the information about inventory and inventory schedule and the parts list information;
   re-calculation of the addable production number for each product on the basis of the surplus parts information; and
   control to output the addable production number for each product to the output unit.

5. A production planning system according to claim 1, wherein the production request information contains priority information representing production priority for each product, and the calculation processing unit executes a planning processing of the production plan from products having higher priority in accordance with the priority.

6. A production planning system for making a production plan of products by calculating a material necessary amount for at least one product on the basis of production request information containing a necessary number of the products and a date, parts list information of the products and information about inventory and inventory schedule of each parts, comprising at least an input unit; an output unit; a storage unit; and a calculation processing unit;
   wherein the input unit accepts production request information of at least one product, parts list information and information of inventory and inventory schedule of each parts; and
   when a production plan of the product is made by calculating a material necessary amount on the basis of the information inputted from the input unit, the calculation processing unit calculates a short number of the products from a producible number obtained from the necessary number in the production request information and a producible number obtained as the result of calculation of the material necessary amount for those products which have a smaller producible number than the necessary number in the production request information as a result of the material necessary amount calculation, calculates necessary parts number necessary for producing the short number of products by looking up the parts list information, calculates a short parts number on the basis of information representing a link result of the material necessary amount calculation and outputs the information about the short parts of the products to the output unit.

7. A production planning system according to claim 6, wherein the information about short parts outputted to the output unit is information that displays a tree structure generated on the basis of the parts list data on a screen and displays a necessary number, an inventory number, a short number and a date of each parts corresponding to a node of the tree displayed on the screen, and the short number calculation unit retrieves the parts list information of each product, extracts the product containing the parts and outputs information of the product as information of linked products when information designating a parts corresponding to the node of the tree is inputted from the input unit.

8. A production planning system according to claim 6, wherein the production planning system of the product is connected to a parts production planning system of a parts maker through a network; and
   the calculation processing unit gains access to the parts production planning system of the parts maker through the network, acquires an addable production number as to a short number of parts of the product the producible number of which is smaller than the necessary number of the production request information as a result of calculation of a material necessary amount in the production planning system of the product, updates the inventory schedule information on the basis of the addable production number, re-calculates a material necessary amount and makes a production plan.

9. A production planning system comprising:
   a production plan generation unit for calculating a material necessary amount on the basis of production request information containing a necessary number of product and a date, parts list information of the product and information about inventory and inventory schedule of each parts;
   an addable number generation unit for calculating datewise a virtual producible maximum number of sets for each product when surplus inventory not linked with a production request as a result of the calculation of the material necessary amount and products and parts expected to form surplus inventory are appropriated; and
   a screen display unit for displaying for each product a production necessary number, an accumulation value of the production necessary number, a production execution number, an accumulation value of the production execution number and an addable number.

* * * * *